United States Patent
Dong et al.

(10) Patent No.: US 12,542,628 B2
(45) Date of Patent: Feb. 3, 2026

(54) METHODS AND DEVICES FOR MANAGING TRANSMISSION ON SHARED SPECTRUM CHANNEL

(71) Applicant: ZTE CORPORATION, Guangdong (CN)

(72) Inventors: Fei Dong, Guangdong (CN); He Huang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 481 days.

(21) Appl. No.: 17/942,778

(22) Filed: Sep. 12, 2022

(65) Prior Publication Data

US 2023/0006781 A1    Jan. 5, 2023

Related U.S. Application Data

(63) Continuation of application No. PCT/CN2020/107520, filed on Aug. 6, 2020.

(51) Int. Cl.
*H04L 1/1829* (2023.01)
*H04W 72/23* (2023.01)
(Continued)

(52) U.S. Cl.
CPC .......... *H04L 1/1854* (2013.01); *H04W 72/23* (2023.01); *H04W 72/569* (2023.01); *H04L 1/1812* (2013.01)

(58) Field of Classification Search
CPC .. H04L 1/1854; H04L 1/1812; H04W 72/569; H04W 72/23
See application file for complete search history.

(56) References Cited

U.S. PATENT DOCUMENTS 11,659,565 B2 * 5/2023 Baek ............... H04L 1/1822
                                                  370/336
12,177,868 B2 * 12/2024 Lyer ............... H04W 72/23
(Continued)

FOREIGN PATENT DOCUMENTS

CN       103460775 A     12/2013
CN       107210889 A      9/2017
(Continued)

OTHER PUBLICATIONS

Office action in Chinese application No. 202080102709.6, dated May 25, 2024, 18 pages (with English Translation).
(Continued)

*Primary Examiner* — Blake J Rubin
(74) *Attorney, Agent, or Firm* — Crowell & Moring LLP

(57) ABSTRACT

This disclosure relates to methods and devices for managing transmission or retransmission on shared spectrum channel in a wireless communication network. In one implementation, the method may include determining if an uplink grant is deprioritized by a uplink shared channel transmission on a shared spectrum channel. The method may further include determining if a media access control (MAC) data packet has been generated for the deprioritized uplink grant. The method may further include, in response to the uplink grant being deprioritized and the MAC data packet being generated for the deprioritized uplink grant, performing a retransmission of the MAC data packet with an available uplink grant.

15 Claims, 4 Drawing Sheets

(51) Int. Cl.
*H04W 72/566* (2023.01)
*H04L 1/1812* (2023.01)

(56) References Cited

U.S. PATENT DOCUMENTS

| | | | | |
|---|---|---|---|---|
| 12,261,698 | B2* | 3/2025 | Wang | H04L 1/08 |
| 2010/0002630 | A1 | 1/2010 | Park et al. | |
| 2014/0369277 | A1 | 12/2014 | Lampinen et al. | |
| 2019/0342037 | A1 | 11/2019 | Karaki et al. | |
| 2020/0154469 | A1 | 5/2020 | Chin et al. | |
| 2020/0205090 | A1 | 6/2020 | Loehr et al. | |
| 2020/0260486 | A1* | 8/2020 | Zhou | H04W 28/0278 |
| 2020/0351030 | A1* | 11/2020 | Deogun | H04W 74/0808 |
| 2021/0105096 | A1* | 4/2021 | Chin | H04L 1/1887 |
| 2021/0307027 | A1* | 9/2021 | Kung | H04W 72/569 |
| 2022/0015187 | A1* | 1/2022 | Huang | H04W 72/1268 |
| 2022/0217644 | A1* | 7/2022 | Kung | H04W 52/365 |
| 2022/0217760 | A1* | 7/2022 | Iyer | H04W 72/20 |
| 2022/0345252 | A1* | 10/2022 | Loehr | H04L 1/1874 |
| 2022/0353899 | A1* | 11/2022 | Xiao | H04L 1/188 |
| 2023/0025815 | A1* | 1/2023 | Lee | H04L 1/1874 |
| 2023/0048889 | A1* | 2/2023 | Yue | H04W 72/566 |
| 2023/0058734 | A1* | 2/2023 | Xiao | H04L 1/1812 |
| 2023/0061643 | A1* | 3/2023 | Chen | H04W 74/004 |
| 2023/0088550 | A1* | 3/2023 | Wang | H04L 1/1822 370/329 |
| 2023/0180221 | A1* | 6/2023 | Zou | H04W 72/566 370/329 |
| 2023/0199754 | A1* | 6/2023 | Lee | H04L 1/1812 370/329 |
| 2023/0262682 | A1* | 8/2023 | Kuo | H04W 72/566 370/329 |
| 2023/0269028 | A1* | 8/2023 | Kang | H04L 1/1812 370/329 |
| 2023/0276461 | A1* | 8/2023 | Lee | H04W 72/02 370/329 |
| 2023/0336313 | A1* | 10/2023 | Loehr | H04L 1/1874 |
| 2024/0022356 | A1* | 1/2024 | Lee | H04W 72/23 |

FOREIGN PATENT DOCUMENTS

| | | |
|---|---|---|
| CN | 107431596 A | 12/2017 |
| CN | 110249671 A | 9/2019 |
| CN | 111165040 | 5/2020 |
| CN | 111181693 | 5/2020 |
| EP | 3 799 680 | 4/2021 |
| WO | WO 2013168137 A2 | 11/2013 |
| WO | 2019/098663 | 5/2019 |

OTHER PUBLICATIONS

No author listed, "Open Issues on NR-U Uplink Transmission," Qualcomm Incorporated, dated Nov. 2019, 3 pages.
No author listed, "Handling a deprioritized PDU for uplink Intra-UE prioritization," Sony, dated Oct. 2019, 4 pages.
No author listed, "Transmission of Deprioritized Data by Retransmission Grant," Samsung, dated Mar. 2020, 4 pages.
Extended European Search Report issued Jun. 9, 2023 in corresponding European Search Report 20948209.0.
Qualcomm Incorporated: "Open Issues on NR-U Uplink Transmission", 3GPP Draft; R2-1916088, $3^{rd}$ Generation Partnership Project (3GPP), Mobile Competence Centre; 650, Route Des Lucioles; F-06921 Sophia-Antipolis Cedex; France, vol. RAN WG2, No. Reno, NV, USA; Nov. 18, 2019-Nov. 22, 2019, XP051817637.
CATT: "[107#80] [NR IIOT] Summary on Deprioritized PDUs (Catt)", 3GPP Draft; R2-1913955 Summary on Deprioritized PDUS, $3^{rd}$ Generation Partnership Project (3GPP), Mobile Competence Centre; 650, Route Des Lucioles; F-06921 Sophia-Antipolis Cedex; France, vol. RAN WG2, No. Chongqing, P. R. China; Oct. 14, 2019-Oct. 18, 2019, XP051805423.
Office Action issued in Chinese application No. 202080102709.6, dated Oct. 31, 2024, 15 pages (with English translation).
International Search Report issued May 7, 2021 in International (PCT) Application No. PCT/CN2020/107520.
Written Opinion of the International Searching Authority issued May 7, 2021 in International (PCT) Application No. PCT/CN2020/107520.
Samsung. "Correction for NR IIOT in 38.321" 3GPP TSG-RAN2 Meeting #109bis-e DraftR2-2005652, Jun. 10, 2020, changes to sections 5.4, 5.8.2.
Nokia et al.; "Summary of Offline Discussion [028]: Intra-UE prioritization and MAC, Part 1", 3GPP TSG-RAN WG2 Meeting #109bis-e, R2-2004130, Apr. 2020, (28 pages).
Vivo et al.; "Text proposal for the UE autonomous retransmission", 3GPP TSG-RAN WG2 Meeting #110, R2-2004739, Jun. 2020, (4 pages).
Chinese-language Office Action issued in Chinese Application No. 202080102709.6 dated Aug. 15, 2025, with English translation (8 pages).

* cited by examiner

400

```
┌─────────────────────────────────────────────────────────────────┐
│ Determining if an uplink grant fails in transmission            │
│                                                             410 │
└─────────────────────────────────────────────────────────────────┘
                                │
                                ▼
┌─────────────────────────────────────────────────────────────────┐
│ Determining if a MAC data packet of the UL grant includes data  │
│ for a data flow with survival time or includes time sensitive   │
│ data, or the UL grant is for TSN flow or a data flow with       │
│ survival time                                                   │
│                                                             420 │
└─────────────────────────────────────────────────────────────────┘
                                │
                                ▼
┌─────────────────────────────────────────────────────────────────┐
│ Increasing the priority level of the MAC data packet            │
│                                                             430 │
└─────────────────────────────────────────────────────────────────┘
```

FIG. 4

METHODS AND DEVICES FOR MANAGING TRANSMISSION ON SHARED SPECTRUM CHANNEL

This application is a continuation application of PCT International Application No. PCT/CN2020/107520, filed with the China National Intellectual Property Administration, PRC on Aug. 6, 2020, which is herein incorporated by reference in its entirety.

TECHNICAL FIELD

This disclosure is directed generally to wireless communications and particularly to manage transmission on shared spectrum channel in a wireless communication network.

BACKGROUND

Wireless communication technologies are moving the world toward an increasingly connected and networked society. The rapid growth of mobile communications and advances in technology have render greater demand for network capacity and connectivity. Other aspects, such as energy consumption, device cost, spectral efficiency, and latency are also important to meeting the needs of various communication scenarios. In comparison with the existing wireless access networks, next generation systems and wireless communication techniques need to support ultra-higher reliability and low latency transmission.

SUMMARY

This disclosure is directed to methods, systems, and devices related to wireless communication, and more specifically, for managing transmission or retransmission on shared spectrum channel in a wireless communication network.

In one embodiment, a method for transmitting a data message and a control message by a user equipment is disclosed. The method may be performed at a user equipment. The method may include determining if an uplink grant (UL) is deprioritized by a uplink shared channel transmission on a shared spectrum channel. The method may further include determining if a media access control (MAC) data packet has been generated for the deprioritized uplink grant. The method may further include, in response to the uplink grant being deprioritized and the MAC data packet being generated for the deprioritized uplink grant, performing a re-transmission of the MAC data packet with an available uplink grant.

In another embodiment, a device for wireless communication may include a memory storing instructions and a processing circuitry in communication with the memory. When the processing circuitry executes the instructions, the processing circuitry is configured to carry out the above methods.

In another embodiment, a computer-readable medium comprising instructions which, when executed by a computer, cause the computer to carry out the above methods.

The above and other aspects and their implementations are described in greater detail in the drawings, the descriptions, and the claims below.

BRIEF DESCRIPTION OF THE DRAWINGS

FIG. 4 shows a flow diagram of a method for wireless communication in accordance with an embodiment.

DETAILED DESCRIPTION

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Section headers are used in the present disclosure to facilitate understanding and do not limit the disclosed technology in the sections only to the corresponding section. Please note that the implementations may, however, be embodied in a variety of different forms and, therefore, the covered or claimed subject matter is intended to be construed as not being limited to any of the embodiments to be set forth below. Please also note that the implementations may be embodied as methods, devices, components, or systems. Accordingly, embodiments of this disclosure may, for example, take the form of hardware, software, firmware or any combination thereof.

Figure 1:
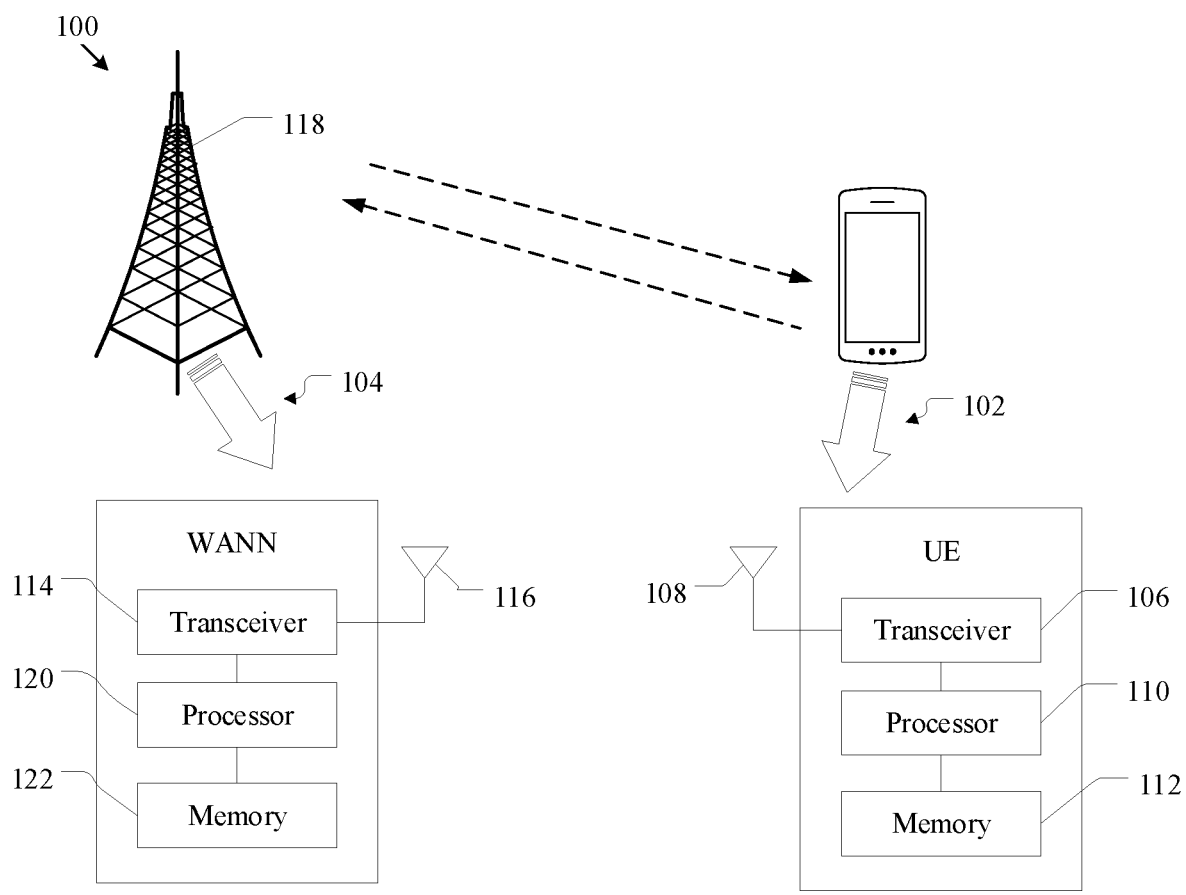
FIG. 1 illustrates an example system diagram including a user equipment and a wireless access network node in accordance with various embodiments.

A wireless access network provides network connectivity between user equipment and an information or data network such as a voice or video communication network, the Internet, and the like. An example wireless access network may be based on cellular technologies, which may further be based on, for example, 4G, Long Term Evolution (LTE), 5G, and/or New Radio (NR) technologies and/or formats. FIG. 1 shows an example system diagram of wireless communication network 100 including a user equipment (UE) 102 and a wireless access network node (WANN) 104 according to various embodiments. The UE 102 may include but is not limited to a mobile phone, smart phone, tablet, laptop computer, a smart electronics or appliance including an air conditioner, a television, a refrigerator, an oven and the like, or other devices that are capable of communicating wirelessly over a network. The UE 102 may include transceiver circuitry 106 coupled to an antenna 108 to effect wireless communication with the wireless access network node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, the wireless access network node 104 may comprise a base station or other wireless network access points capable of communicating wirelessly over a network with one or more UEs. For example, the wireless access network node 104 may comprise a 5G new radio (NR) base station, a 5G central-unit base station, or a 5G distributed-unit base station, a 5G core station, or an application server in various embodiments. Each type of these wireless access network nodes may be configured to perform a corresponding set of wireless network functions. The set of wireless network functions between different types of wireless access network nodes may not be identical. The set of wireless network functions between different types of wireless access network nodes, however, may functionally overlap. The wireless access node 104 may include transceiver circuitry 114 coupled to an antenna 116, which may include an antenna tower 118 in various approaches, to effect wireless communication with the UE 102. The transceiver circuitry 114 may also be coupled to one or more processors 120, which may also be coupled to a memory 122 or other storage device. The memory 122 may store therein instructions or code that, when read and executed by the processor 120, cause the processor 120 to implement various ones of the methods described herein.

For simplicity and clarity, only one WANN and one UE are shown in the wireless communication network 100. It will be appreciated that one or more WANNs may exist in the wireless communication network, and each WANN may serve one or more UEs in the meantime. In addition, while various embodiments will be discussed in the context of the particular example wireless communication network 100, the underlying principle applies to other applicable wireless communication networks.

The evolving new generation wireless communication network may provide the shared spectrum (also referred to as un-authorized frequency bands) channel as potential working spectrum resources. Network elements such as UE and WANN working on the shared spectrum may be required to access the transmission channel in the manner of Listen before Talk (LBT). That said, the network elements first need to detect the channel, and then occupy the channel for transmission only when meeting a channel access condition. A user equipment may receive a plurality of uplink grants for respective data transmissions on the shared spectrum channel. The uplink grants may, for example, include a specific physical control channel information from the WANN, which may include, for example, resource allocation information. The resource allocation information may indicate that the resource on a shared spectrum is allocated to the UE for the corresponding data transmission. The uplink grant may include uplink dynamic grant and uplink configured grant. The uplink dynamic grant may represent that the WANN dynamically allocate resource for the uplink grant. The uplink configured grant may represent that the WANN may preconfigure resource allocation for the uplink grant.

To perform the corresponding data transmission on the shared spectrum channel, multiple uplink grants indicating the overlapping UL transmission in a same frequency band may have been received by UE, which renders intra-UE uplink collision on shared channel transmission. As a result, one or more uplink grants may succeed in the competition and occupy the resource for data transmission while other uplink grants may fail and cannot occupy the resource for data transmission. The uplink grants succeeding in the competition may be referred to as prioritized uplink grant while the failed uplink grant may be referred to as deprioritized uplink grant. The uplink grants failing in the competition would be deprioritized. One of the objective of the present disclosure is to address the retransmission of the data packet corresponding to the deprioritized uplink grants.

Figure 2:
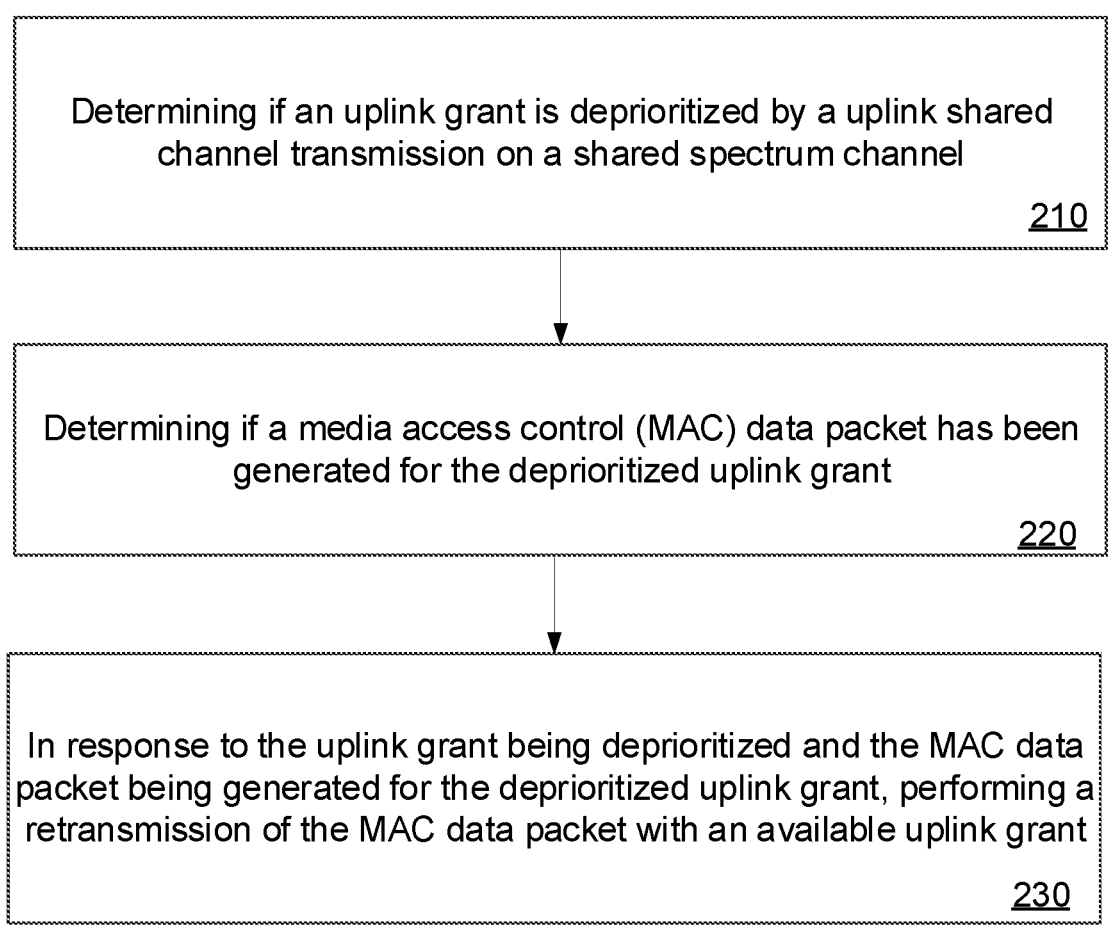
FIG. 2 shows a flow diagram of a method for wireless communication in accordance with an embodiment.

FIG. 2. illustrates an example implementation 200 of transmitting or retransmitting the data for deprioritized uplink grant on the shared spectrum channel. By way of example, various operations of a user equipment such as the UE 102 that perform the uplink transmission or retransmission will be described with reference to FIG. 1 and FIG. 2.

In an implementation, the UE 102 may first determine if an uplink grant is deprioritized by a uplink shared channel transmission on a shared spectrum channel (210). For example, in the case that there are overlapping physical uplink share channel (PUSCH) transmission for different uplink grants in the same bandwidth part (BWP), the UE 201 may determine that one uplink grant is prioritized for transmission and other uplink grants are deprioritized. If the uplink grant is deprioritized, the UE 102 may determine if a media access control (MAC) data packet, such as a MAC protocol data unit (PDU), has been generated for the deprioritized uplink grant (220). If the MAC data packet has been generated, the UE 102 may perform a transmission or retransmission of the MAC data packet to the WANN 118 with an available uplink grant, for example, a next available uplink grant (230).

The UE 102 may configure a retransmission timer for the retransmission of the MAC data packet. The retransmission timer may include, for example, ConfiguredGrantTimer or RetransmissionTimer. In an implementation, where the deprioritized uplink grant is a dynamic grant, the UE 102 may pend a hybrid automatic repeat request (HARQ) process identifier or HARQ identifier (ID) of the deprioritized uplink grant. The HARQ process ID may be used to index the MAC data packet corresponding to the deprioritized uplink grant. The MAC data packets to be transmitted may be temporarily stored in a local data packet buffer of the UE 102. If the HARQ process ID is for configured grant configuration, the UE 102 may start/restart the configuredGrantTimer. In an implementation, one or more HARQ process IDs maybe configured in a configured grant configuration. For a dynamic grant, it may be scheduled by the WANN 118 with a down link control signal. For a configured grant, it may be configured in the radio resource control signaling transmitted by the WANN 118.

In another implementation, where the deprioritized uplink grant is a configured grant, the UE 102 may pend the HARQ process ID of the deprioritized uplink grant. Then, the UE 102 may start/restart ConfiguredGrantTimer for the HARQ process identifier. Alternatively, the UE 102 may start/restart both ConfiguredGrantTimer and cg-RetransmissionTimer for the HARQ process identifier.

To perform the transmission or retransmission of the MAC data packet, the UE 102 may select the HARQ process identifier of the deprioritized uplink grant as the HARQ process identifier of a next available uplink grant. In this way, the UE 102 may configure to transmit the MAC data packet corresponding to deprioritized uplink grant with the next available uplink grant.

When configuring to transmit the MAC data packet, the UE 102 may treat it as either a new transmission or a retransmission. Where the transmission of the MAC data packet is treated as a retransmission, the UE 102 may configure a uplink control signal associated with the MAC data packet to include a non-toggled new data indication (NDI). The NDI may indicate a transmission type for the HARQ process ID, e.g., a new transmission or a retransmission. Where the transmission of the MAC data packet is treated as a new transmission, the UE 102 may configure the uplink control signal associated with the MAC data packet to include a toggled NDI. That said, there is a new transmission with the HARQ process ID.

Figure 3:
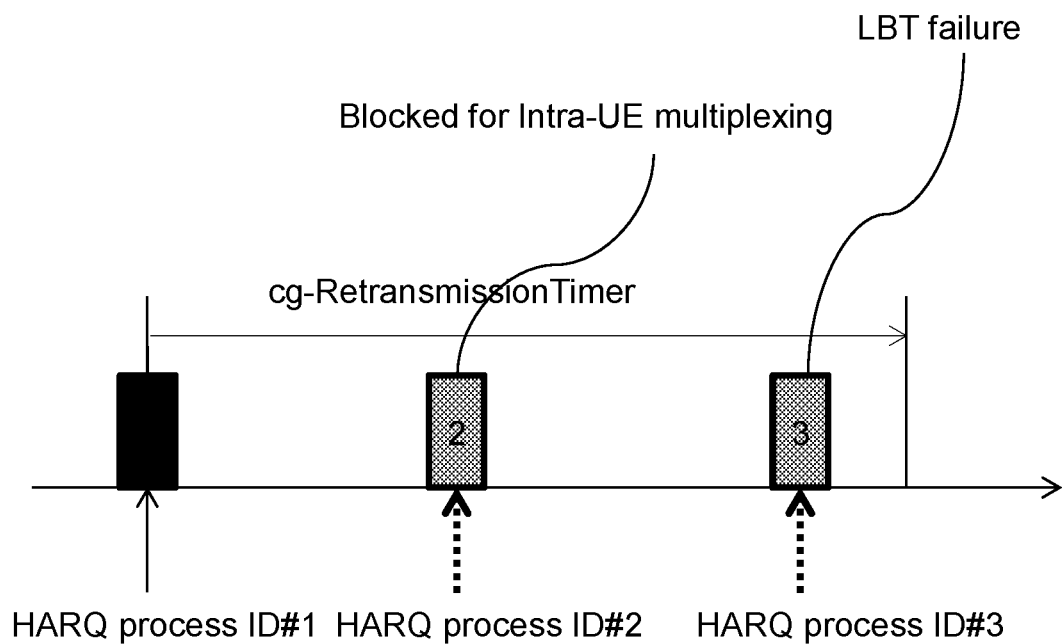
FIG. 3 schematically illustrates various configured grants failures.

In an implementation, the UE 102 may have a plurality of uplink grants failing in transmission. The configured grants may include configured grant or dynamic configured grant. All the configured grants may be waiting for a next available uplink grant for transmission or retransmission. The plurality of configured grants may include configured grants failing for various reasons. For example, as illustrated in FIG. 3, the configured grant may fail for suffering listen before talk failure, e.g., HARQ process #3. The configured grant may fail for not receiving acknowledgement message before a cg-retransmissionTimer is expired, e.g. HARQ process #1. The configured grant may fail for being deprioritized while a MAC data packet associated with the configured grant has been generated, e.g., HARQ process #2. The configured grant may fail for receiving a non-acknowledgment message.

The plurality of configured grants failing in transmission may all wait for data transmission with the next available uplink grant. The UE 102 may determine which configured grant failing in transmission would be selected for data transmission based on HARQ process identifiers of the configured grants. In an implementation, the UE 102 may select a target HARQ process identifier whose associated UL grant failing in transmission among the HARQ process identifiers whose associated UL grant failing in transmission based one or more criteria. In an implementation, a HARQ process Identifier failing in transmission shall be selected among multiple HARQ process Identifiers failing in transmission based on priorities of MAC data packets respectively associated with the HARQ process identifiers. For example, the HARQ process identifier with the higher MAC data packet priority may be selected as the target HARQ process identifier. The priority of a MAC data packet can be determined by the logical channel (LCH) with the highest priority among LCHs whose available data are multiplexed or can be multiplexed into this MAC data packet. Additionally or alternatively, the UE 102 may select a HARQ process identifier being blocked by a LBT failure as the target HARQ process identifier. Additionally or alternatively, the UE 102 may select a HARQ process identifier whose retransmission timer is expired as the target HARQ process identifier. Additionally or alternatively, the UE 102 may select a HARQ process identifier having earliest initial transmission among the HARQ process identifiers as the target HARQ process identifier. Additionally or alternatively, the UE 102 may select a HARQ process identifier whose associated MAC data packet includes the MAC control element (CE) with the highest priority among all the MAC data packets for the plurality of configured grants in failing transmission, as the target HARQ process identifier. In some implementation, the priority level of MAC CE is defined in the specification. When the target HARQ process identifier is selected, the UE 102 may prioritize the target HARQ process identifier so as to use the next available uplink grant to transmit MAC data packet associated with the target HARQ process identifier.

In another implementation, before performing retransmission on shared spectrum channel, the UE 102 may first determine whether the UE 102 supports the autonomous retransmission for intra-UE multiplexing on shared spectrum channel. For example, the UE 102 may determine to support autonomous retransmission for the configured grant if the information element autonomousTX is configured for the configured grant. Alternatively, the UE 102 may determine to support autonomous retransmission for the configured grant if both the information element autonomousTX and the cg-retransmission Timer are configured for the configured grant. Alternatively, the UE 102 may refer to a new information element defined to indicate whether the UE 102 support autonomous retransmission on the shared spectrum channel.

If the UE 102 supports autonomous retransmission or transmission, the UE 102 may determine whether a configured grant has been deprioritized and the MAC data packet for the deprioritized configured grant has been generated. If this is the case, the UE 102 may determine whether the cg-retransmission Timer as configured above is running. If this is the case, the MAC entity of the UE 102 may set the HARQ process ID of the deprioritized configured grant as the HARQ process ID of the target configured grant for retransmission or transmission. In an implementation, the next available configure grant may serve as the target configured grant. Alternatively, the UE 102 may have some additional requirements on the target configured grant. For example, the target configured grant may have to have the same configured grant configuration with the deprioritized configured grant. For another example, the target configured grant may have to have different configured grant configuration than the deprioritized configured grant. In this case, the target configured grant may have to have the same transmission block size with the deprioritized configured grant.

Then, the MAC entity of the UE 102 may send the MAC data packet and associated uplink control signal (UCI) in the corresponding HARQ buffer to the lower layer of the UE 102 for transmission in the target configured grant. The UE 102 may transmit the MAC data packet as a new transmission or a retransmission. For example, the autonomous retransmission for intra-UE multiplexing may be treated as a new transmission while the autonomous retransmission for NRU may be treated as retransmission. Where the transmission of the MAC data packet is treated as a retransmission, the UE 102 may configure the uplink control signal to include a non-toggled new data indication (NDI). Where the transmission of the MAC data packet is treated as a new transmission, the UE 102 may configure the uplink control signal to include a toggled NDI.

In the case that the UE 102 suffers from UL grant transmission failure, to increase the probability for the new available uplink grant to succeed in the competition for the transmission resource, the new available uplink grant may be reasonably prioritized in various ways. In an implementation, the priority of UL grant may be the same as the priority of the MAC data packet transmitted with this UL grant. This is especially important when the MAC data packet contains time sensitive data which requires low transmission latency. For example, the MAC data packet is used for a time sensitive network (TSN) flow.

FIG. 4 illustrates an example implementation 200 of retransmitting or transmitting the data used for the TSN flow. The UE 102 may determine if the UL grant fails in transmission (410). In an implementation, The failure in transmission of the UL grant may include at least one of the following events: (1) LBT failure; (2) a NACK is received from the WANN 118; (3) No ACK can be received within the a certain period; (4) the UL grant is deprioritized. If so, the UE 102 may determine if the MAC data packet of the UL grant includes data for a data flow with survival time or includes time sensitive data, or determine if the UL grant is for TSN flow or a data flow with survival time (420). For example, where the logical channel (LCH) whose data is multiplexing in the MAC data packet is configured with an indication information element such as PriorityRamping or priorityForRetransmission. the UE 102 may determine that the MAC data packet includes the data for a data flow with survival time or TSN flow. For another example, a survival time indicator may be defined in a downlink control information (DCI) or in a configured grant configuration. Where the UE 102 reads such survival time indicator from the DCI or the configured grant configuration for the retransmission or transmission in the case that the transmission will be collided with other UL transmission, the UE 102 may determine that the MAC data packet includes the data for TSN flow with survival time. Upon determining the MAC data packet includes the data for TSN flow with survival time, the UE 102 may increase the priority level of the MAC data packet (430).

Optinally, when the UE 102 receives an uplink grant used for retransmission and the MAC data packet for initial transmission includes the data for TSN flow with survival time, the UE 102 may increase the priority level of this MAC data packet.

The priority level of the MAC data packet may be increased in various manners. For example, in the case that the information element priorityRamping as discussed above is used to indicate TSN flow, the UE 102 may increase the priority level of the MAC data packet by subtracting the value of information element priorityRamping from the value of priority level for the MAC data packet. Here, the less priority level value may represent a higher priority level. The UE 102 may perform such subtraction for each retransmission of the MAC data packet until the MAC data packet reaches to the highest priority level, for example, the value of priority level for the MAC data packet is equal to 1 or 0. In an implementation, for each failure transmission of the MAC data packet, the value of the priority level of this MAC PDU may be subtracted by priorityRamping. Alternatively, in the case that the information element priorityForRetransmission is used to indicate the TSN flow, the UE 102 may increase the priority level of the MAC data packet to a designated priority level. For example, the UE 102 may set the value of the priority level of the MAC data packet to the value of information element priorityForRetransmission.

For another example, in the case that the indicator information element PriorityRamping or priorityForRetransmission in the DCI or the configured grant configuration is used to indicate the TSN flow, the UE 102 may increase the priority level of the MAC data packet by subtracting the value of PriorityRamping from the value of priority level for the MAC data packet. Here, the less priority level value may represent a higher priority level. The UE 102 may perform such subtraction for each transmission of the MAC data packet until the MAC data packet reaches to the highest priority level, for example, the value of priority level for the MAC data packet is equal to 1 or 0. In an implementation, for each failure transmission of the MAC data packet, the value of the priority level of this MAC data packet may be subtracted by PriorityRamping. Alternatively, in case that the failed transmission of a MAC data packet occurs, the UE 102 may simply set the value of the priority level of the MAC data packet to the value of the priorityForRetransmission.

Furthermore, instead of prioritizing the MAC data packet, the UE 102 may prioritize the logical channel. In an implementation, if a uplink grant fails in transmission, the UE 102 may determine if the logical channel whose data is multiplexed into the MAC data packet associated with the UL grant failing in transmission is used for TSN flow or a data flow with survival time. For example, the logical channel may be configured with a survival time indication element indicating the TSN flow with survival time, e.g., PriorityRamping or priorityForRetransmission. The UE 102 may make the TSN flow determination based on the survival time indication element configured for the logical channel. Alternatively, the survival time indication element may be included in a configured grant configuration corresponding to the logical channel. Alternatively, the survival time indication element may be included in the DCI.

If it is determined that the logical channel is used for TSN flow, the UE 102 may increase the priority level of the logical channel. For example, in the case that the indication element priorityRamping in the configuration of the logical channel is used to indicate TSN flow, the UE 102 may increase the priority level of the logical channel by subtracting the value of PriorityRamping from the value of priority level for this LCH. In some implementations, for each failure transmission of the MAC PDU where the data from this LCH is multiplexed in including the case of associated UL grant is deprioritized, the value of the priority level of this LCH may be subtracted by PriorityRamping. Similarly, in the case that the indication element priorityForRetransmission in the configuration of the logical channel is used to indicate the TSN flow, the UE 102 may increase the priority level of the logical channel by setting the value of the priority level of the logical channel to the value of information element priorityForRetransmission. In an implementation, once the transmission of this MAC data packet where the data from this LCH is multiplexed in is failed, the UE 102 may simply set the value of the priority level of the MAC data packet to the value of priorityForRetransmission.

Since it is not unreasonable to keep the logical channel at such higher priority level, the UE 102 may return the priority level of the logical channel to the original priority level, for example, according to a predefined rules. For example, in the case that the logical channel is gradually prioritized by performing priority level value decrement as discussed above, the UE 102 may gradually deprioritize the logical channel by performing priority value increment. For example, the UE 102 may increase the priority level value of the logical channel by priorityRamping for each prioritization of the logical channel. In an implementation, for each successful transmission of the data from this LCH, the priority value of this LCH is incremented by priorityRamping once. In another implementation, the symbol of the successful transmission can be indicated by the reception of the DCI or dynamic scheduling new transmission from the WANN 118 and the HARQ process ID of the new transmission is equal to the HARQ process ID of the successful transmission, or indicated by receiving an ACK from the WANN 118. In the case that the logical channel is directly prioritized to a designated priority level, the UE 102 may simply return the priority level of the logical channel from the designated priority level to the original priority level. In some implementations, for each successful transmission of the data from this LCH, the priority level value of this LCH may return to the original priority value.

Optionally, the UE 102 may configure a return timer for a logical channel. The return timer can be started/restarted each time the UL grant failing in transmission where the data from the logical channel is multiplexed. The UE 102 may return the priority level of the logical channel to the original priority level when the return timer is expired.

Optionally, the UE 102 may change the logical channel restriction for the TSN flow with survival time. In an implementation, the UE 102 may determine whether the UL grant is in failing transmission where the data from a LCH is multiplexed. If so, the UE 102 may determine whether the logical channel whose data is multiplexed into this MAC data packet for this UL grant supports the UE based logical channel restriction change. For example, if the logical channel is configured with a plurality of logical channel restriction sets, among which there is a logical channel restriction set serving as a default or original set and there is at least one another logical channel restriction set which the UE 102 may switch to, it can be determined that the logical channel supports the logical channel restriction change. The logical channel restriction set may include, for example, the following parameters:

allowedSCS-List which sets the allowed subcarrier spacing(s) for transmission;
maxPUSCH-Duration which sets the maximum PUSCH duration allowed for transmission;
configuredGrantType1Allowed which sets whether a configured grant type 1 can be used for transmission;
allowedServingCells which sets the allowed cell(s) for transmission;
allowedCG-List which sets the allowed configured grant(s) for transmission;
allowedPHY-PriorityIndex which sets the allowed PHY priority index(es) of a dynamic grant for transmission.

Alternatively, to determine whether the LCH is supporting the LCH restriction change, an enabled indication may be configured to the logical channel to indicate that the logical channel supports the logical channel restriction change. If an enabled indication is set to be enabled, it may represent the logical channel can be selected by MAC entity of the UE 102 for any uplink grant including configured grant and dynamic grant.

Later, the UE 102 may resume the default logical channel restriction for the logical channel according to a predetermined rule. For example, the UE 102 may resume the default logical channel restriction when receiving an indication from the WANN 118, e.g., a MAC CE or DCI. For another example, a resume timer may be configured for the logical channel. The UE 102 may start/restart the resume timer when an UL grant fails in transmission and the data from the LCH is multiplexed into the MAC data packet for this UL grant. Then, the UE 102 may resume the logical channel restriction for the logical channel to the default logical channel restriction at the expiration of the resume timer.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method performed by a user equipment for wireless communication, comprising:
    determining a plurality of configured grants failing in transmission and waiting for a next available uplink grant;
    selecting a target hybrid automatic repeat request (HARQ) process identifier from HARQ process identifiers of the plurality of configured grants; and
    prioritizing the target HARQ process identifier to transmit a media access control (MAC) data packet associated with the target HARQ process identifier with the next available uplink grant; and
    sending an uplink control signal (UCI) including a non-toggled new data indication (NDI) to a lower layer of the user equipment, the non-toggled NDI indicating that the transmission of the MAC data packet being treated as a retransmission.

2. The method of claim 1, wherein a priority level for a HARQ process identifier is determined based on a priority of a logical channel with a highest priority among logical channels whose available data are multiplexed into a MAC data packet associated with the HARQ process identifier.

3. The method of claim 1, wherein the plurality of configured grants failing in transmission comprises at least one of:
    a configured grant suffering listen before talk failure,
    a configured grant not receiving acknowledgement message before a cg-retransmissionTimer being expired,
    a configured grant receiving a non-acknowledgment message, or
    a configured grant being deprioritized while a MAC data packet associated with the configured grant being generated.

4. The method of claim 1, wherein the selecting the target HARQ process identifier comprises:
selecting the target HARQ process identifier with a highest priority level from the HARQ process identifiers whose associated configured grant is failing in transmission.

5. The method of claim 1, wherein a priority level for a HARQ process identifier is determined based on a priority of a logical channel with a highest priority among logical channels whose available data are multiplexed or can be multiplexed into the MAC data packet associated with the HARQ process identifier.

6. A user equipment comprising:
a memory operable to store computer-readable instructions; and
a processor circuitry operable to read the computer-readable instructions,
the processor circuitry when executing the computer-readable instructions is configured to:
determine a plurality of configured grants failing in transmission and waiting for a next available uplink grant;
select a target hybrid automatic repeat request (HARQ) process identifier from HARQ process identifiers of the plurality of configured grants;
prioritize the target HARQ process identifier to transmit a media access control (MAC) data packet associated with the target HARQ process identifier with the next available uplink grant; and
sending an uplink control signal (UCI) including a non-toggled new data indication (NDI) to a lower layer of the user equipment, the non-toggled NDI indicating that the transmission of the MAC data packet being treated as a retransmission.

7. A non-transitory machine-readable media, having instructions stored on the machine-readable media, the instructions configured to, when executed, cause a machine to:
determine a plurality of configured grants failing in transmission and waiting for a next available uplink grant;
select a target hybrid automatic repeat request (HARQ) process identifier from HARQ process identifiers of the plurality of configured grants;
prioritize the target HARQ process identifier to transmit a media access control (MAC) data packet associated with the target HARQ process identifier with the next available uplink grant; and
sending an uplink control signal (UCI) including a non-toggled new data indication (NDI) to a lower layer of the user equipment, the non-toggled NDI indicating that the transmission of the MAC data packet being treated as a retransmission.

8. The user equipment of claim 6, wherein a priority level for a HARQ process identifier is determined based on a priority of a logical channel with a highest priority among logical channels whose available data are multiplexed into a MAC data packet associated with the HARQ process identifier.

9. The user equipment of claim 6, wherein the plurality of configured grants failing in transmission comprises at least one of:
a configured grant suffering listen before talk failure,
a configured grant not receiving acknowledgement message before a cg-retransmission Timer being expired,
a configured grant receiving a non-acknowledgment message, or
a configured grant being deprioritized while a MAC data packet associated with the configured grant being generated.

10. The user equipment of claim 6, wherein the processor circuitry is configured to:
select the target HARQ process identifier with a highest priority level from the HARQ process identifiers whose associated configured grant is failing in transmission.

11. The user equipment of claim 6, wherein a priority level for a HARQ process identifier is determined based on a priority of a logical channel with a highest priority among logical channels whose available data are multiplexed or can be multiplexed into the MAC data packet associated with the HARQ process identifier.

12. The non-transitory machine-readable media of claim 7, wherein a priority level for a HARQ process identifier is determined based on a priority of a logical channel with a highest priority among logical channels whose available data are multiplexed into a MAC data packet associated with the HARQ process identifier.

13. The non-transitory machine-readable media of claim 7, wherein the plurality of configured grants failing in transmission comprises at least one of:
a configured grant suffering listen before talk failure,
a configured grant not receiving acknowledgement message before a cg-retransmissionTimer being expired,
a configured grant receiving a non-acknowledgment message, or
a configured grant being deprioritized while a MAC data packet associated with the configured grant being generated.

14. The non-transitory machine-readable media of claim 7, wherein the instructions are configured to cause the machine to:
select the target HARQ process identifier with a highest priority level from the HARQ process identifiers whose associated configured grant is failing in transmission.

15. The non-transitory machine-readable media of claim 7, wherein a priority level for a HARQ process identifier is determined based on a priority of a logical channel with a highest priority among logical channels whose available data are multiplexed or can be multiplexed into the MAC data packet associated with the HARQ process identifier.

* * * * *